(12) United States Patent
Norman

(10) Patent No.: US 7,628,372 B2
(45) Date of Patent: Dec. 8, 2009

(54) UNIVERSAL MOUNTING FOR A VEHICLE REAR VIEW MIRROR

(76) Inventor: Timothy Hugh Norman, The New House, St. Martin's, Scilly (IT) TR25 0QL ( * ) Notice: Subject to any disclaimer, the term of this patent is extended or adjusted under 35 U.S.C. 154(b) by 102 days.

(21) Appl. No.: 10/595,475

(22) PCT Filed: Oct. 20, 2004

(86) PCT No.: PCT/GB2004/004438
§ 371 (c)(1),
(2), (4) Date: Apr. 21, 2006

(87) PCT Pub. No.: WO2005/044624
PCT Pub. Date: May 19, 2005

(65) Prior Publication Data
US 2007/0146913 A1 Jun. 28, 2007

(30) Foreign Application Priority Data
Oct. 22, 2003 (GB) .................................. 0324652.7

(51) Int. Cl.
A47F 7/14 (2006.01)
A47G 1/16 (2006.01)

(52) U.S. Cl. ...................... 248/475.1; 248/214; 248/466
(58) Field of Classification Search ................. 248/468, 248/446, 475.1, 476, 214, 466
See application file for complete search history.

(56) References Cited

U.S. PATENT DOCUMENTS

| | | | | | |
|---|---|---|---|---|---|
| 1,107,811 | A | * | 8/1914 | Lucas | .......................... 248/207 |
| 5,106,177 | A | * | 4/1992 | Dolasia | ....................... 359/876 |
| 5,165,081 | A | * | 11/1992 | Drumheller | .................. 359/854 |
| D381,113 | S | * | 7/1997 | Safyan | ....................... D26/140 |
| 6,220,717 | B1 | * | 4/2001 | Pastore | ....................... 359/871 |
| 6,527,240 | B1 | * | 3/2003 | Huang | ..................... 248/311.2 |
| 6,719,255 | B2 | * | 4/2004 | Chen | ........................... 248/323 |

* cited by examiner

Primary Examiner—Amy J. Sterling
(74) Attorney, Agent, or Firm—Lucas & Mercanti, LLP

(57) ABSTRACT

The universal mounting for a vehicle rear view mirror has a mounting bracket which is attached to the mirror on one side and has an engaging surface for engaging a mirror arm on the opposite side; a clamp holds the mirror arm against the engaging surface. The engaging surface is an open recess with two parallel, opposing end walls, and base that extends between the two end walls. The base forms in perpendicular to the end walls. In the middle of the base is a V-shaped recess. The engaging surface is designed to hold mirror arms that different cross sectional shape, such as, a polygon or a circle.

13 Claims, 3 Drawing Sheets

UNIVERSAL MOUNTING FOR A VEHICLE REAR VIEW MIRROR

This invention relates to a universal mounting for a vehicle rear view mirror.

Commercial vehicles are provided with rear view mirror mounting arms which extend from the vehicle and are adapted to carry a rear view mirror. However, these mirror mounting arms are formed in a variety of shapes and sizes. In particular, some are formed with a polygonal cross section, for example square or rectangular, while others are formed with a circular cross section, and they commonly vary between 16 mm and 28 mm in diameter.

Therefore, rear view mirrors for commercial vehicles must be provided with the correct form and size of mounting to co-operate with the mounting arm with which they are to be used. To date, manufacturers have had to provide a variety of mountings to accommodate the different mounting arms. This adds to the development and manufacturing costs of the rear view mirrors, and therefore their retail price. Further, a mirror adapted for use with one size and type of mirror mounting arm cannot mounted onto another type of mounting arm on another vehicle. This can cause problems when users have a number of vehicles and want to use the mirrors as replacement parts.

Adjustable clamping means are well known, however, they are often bulky, time consuming to use and comprise a number of parts. For ease of manufacture and use, a novel approach is required.

The object of the present invention is to overcome some of the above problems.

Therefore, according to the present invention a universal mounting for a vehicle rear view mirror adapted to fit on a mirror arm of any cross-section comprises a mirror arm engaging surface and clamping means, in which the clamping means are adapted to extend around or through a mirror arm with which the mounting is to be used, and to urge the mirror arm engaging surface against said mirror arm, and in which the mirror arm engaging surface is adapted to engage mirror arms of any cross section.

In a preferred construction the mirror arm engaging surface comprises a first substantially rectangular shaped recess formed in the mounting, the longer side of which forms the base of the recess, and a second substantially V-shaped recess formed in said base, in which the two surfaces are angled at approximately 120 degrees to one another. The width of the second recess can be less than the width of the base, such that a flat section of the base remains on either side of the second recess.

In use the first recess can engage mirror arms provided with a substantially polygonal cross section, for example square or rectangular, and the second recess can engage mirror arms provided with a substantially polygonal or circular cross section.

In a preferred construction the mirror arm engaging surface is adapted to engage mirror arms with a substantially circular or multi-sided cross section with a diameter of between substantially 16 mm and substantially 28 mm. The depth of the second recess can be such that when a mirror arm with a substantially circular or multi-sided cross section with a diameter of substantially 28 mm is engaged, the mirror arm does not contact the leading edges of the first recess.

However the construction is not limited to these dimensions, and the engaging surface could be made to accept any suitable dimension, for example 32 mm or even larger.

It will be appreciated that the first recess may be able to engage mirror arms with a square cross section, the width of which are between length of the first recess, and the length of the second recess. Any narrower than this and mirror arms with a square cross section would fall into the second recess.

In a first construction according to the invention the mounting can be securely fixed to the rear view mirror, and the clamping means may comprise a cap, the internal dimensions of which are greater than the mounting, such that the cap can be placed over the mounting, and a pair of bolts which pass through the cap and into sockets provided in the mounting. The cap may be provided with a mirror arm engaging surface comprising a substantially V or U-shaped recess, which is substantially 28 mm wide.

Preferably the V or U shaped recess is also provided with re-entrant cut-outs to engage the corners of polygonal cross-section arms, for example square section arms.

In use the mounting is placed against one side of the mirror arm, and the cap is placed on the opposite side, such that it extends around the mirror arm and over the mounting. The bolts are then screwed into the slots, and the rear view mirror is fitted in place.

In a second construction according to the invention the mounting can be releasable from the rear view mirror and the clamping means may comprise a central bolt, which passes through an aperture provided in the mirror arm, through an aperture provided in the base of the mounting and through an aperture provided in the back of the rear view mirror, where it is attached to a securing means. The bolt can be provided with a socket in its head adapted to receive the bolt of an outer clamping member. The outer clamping member can have a substantially flat mirror arm engaging surface, and a hand grip portion.

In this construction the mounting is placed against one side of the mirror arm, and the central bolt is passed through the mirror arm, the mounting and the back of the rear view mirror. The securing means are then threaded onto the central bolt. The bolt of the outer clamping member is then placed into the socket in the head of the central bolt, and the hand grip portion is rotated clockwise until the bolt of the outer clamping member is securely fastened to the central bolt, and the central bolt is securely fastened to the securing means, and the rear view mirror is fitted in place. If the rear view mirror requires adjustment the hand grip portion is turned anti clockwise to release the clamping member bolt from the central bolt, thereby to facilitate adjustment without having to dismantle all the above described components.

The central bolt may be provided with a hexagonal head, so that it can be released by means of a suitable tool, for example a socket spanner or socket set, and the above described components can be fully dismantled if desired.

In a preferred embodiment the mounting may be provided with both the sockets to receive the bolts on the cap, and the aperture to receive the central bolt, so it can be used in either of the two above described constructions.

The invention also includes a vehicle rear view mirror with or without a mirror mounting arm and provided with a mounting adapted top fit on a mirror arm of any cross-section as set forth above.

The invention can be performed in various ways, but one embodiment will now be described by way of example, and with reference to the accompanying drawings in which.

Figure 1:
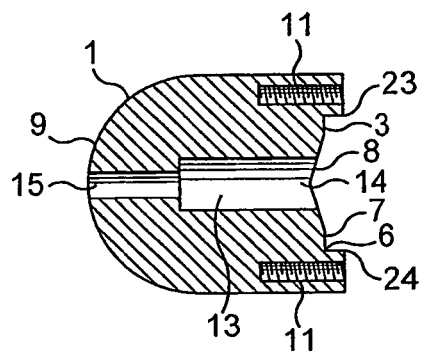
FIG. 1 is a cross sectional side view of a mounting for a rear view mirror according to the present invention.
Figure 2:
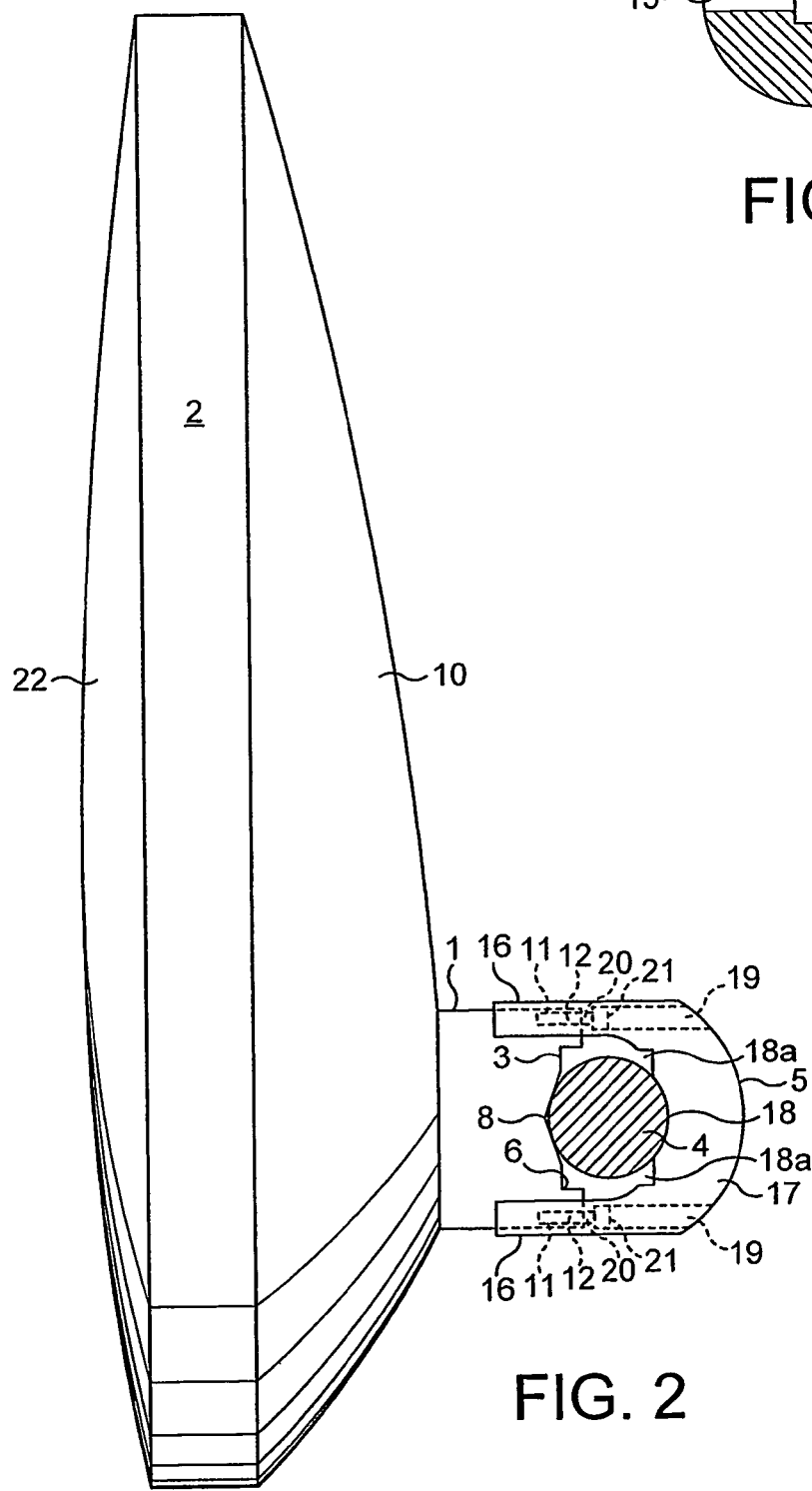
FIG. 2 is a side view of the mounting shown in FIG. 1 in use in a first arrangement with a circular mirror arm.
Figure 3:
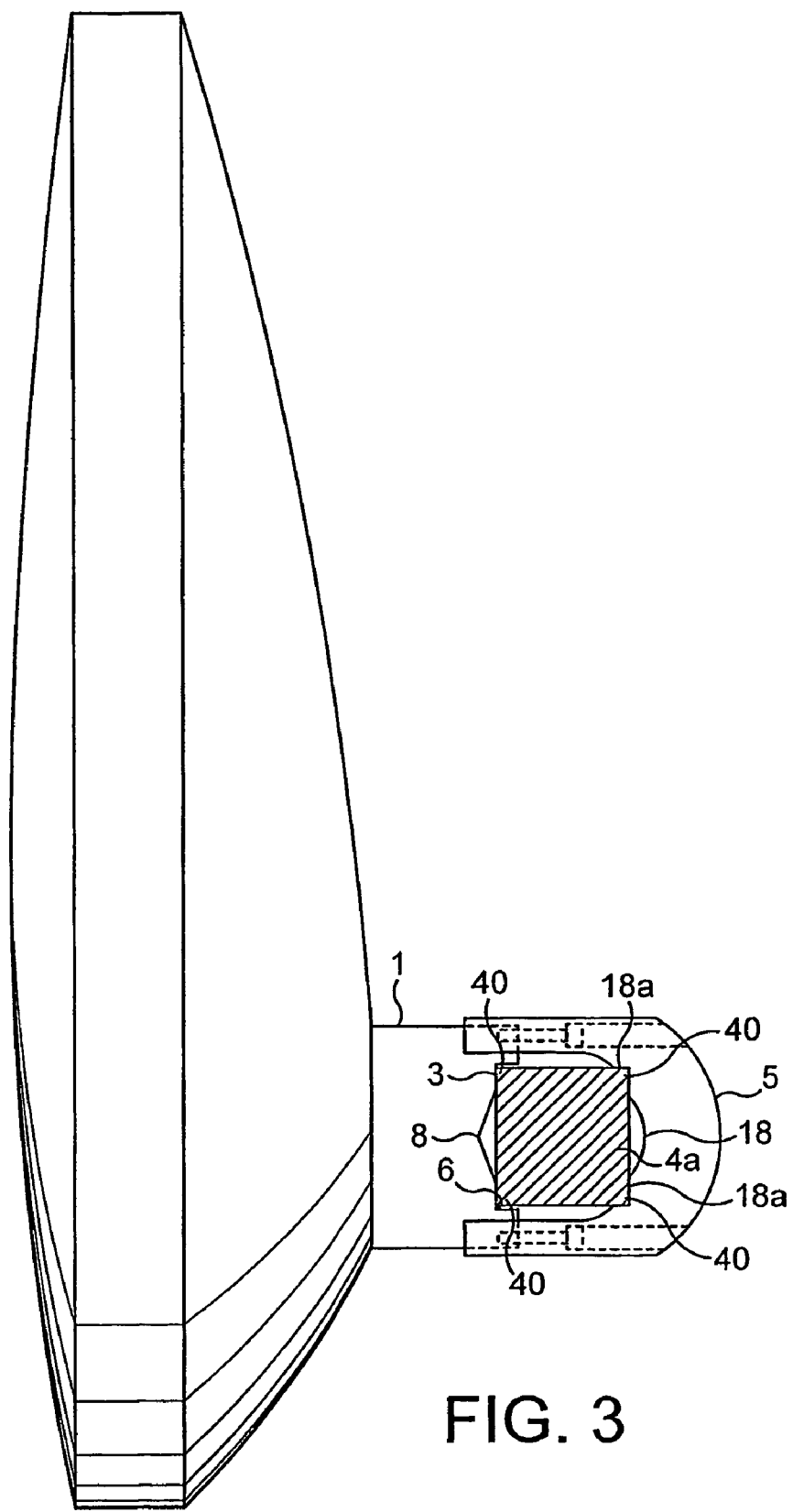
FIG. 3 is a side view of the arrangement shown in FIG. 2 in use with a square mirror arm; and, FIG. 4 is a side view of the mounting shown in FIG. 1 in use in a second arrangement.

As shown in FIGS. 1, 2 and 3 a mounting 1 for a vehicle rear view mirror 2 which has a circular or square cross-section mirror arm comprises a mirror arm engaging surface 3 and clamping means in the form of cap 5. Cap 5 extends around a mirror arm 4 (shown in cross section) and urges the mirror arm engaging surface 3 against said mirror arm 4. As shown in FIGS. 2 and 3 the mirror arm engaging surface 3 is adapted to engage mirror arms of substantially square and substantially circular cross section As shown best in FIG. 1, this is achieved by the mirror arm engaging surface comprising a first substantially rectangular shaped recess 6 formed in the mounting 1, the longer side of which forms the base 7 of the recess 6, and a second substantially V-shaped recess 8 formed in the base 7 of the first recess 6. The two surfaces of the second recess 8 are angled at 120 degrees to one another.

Figure 4:
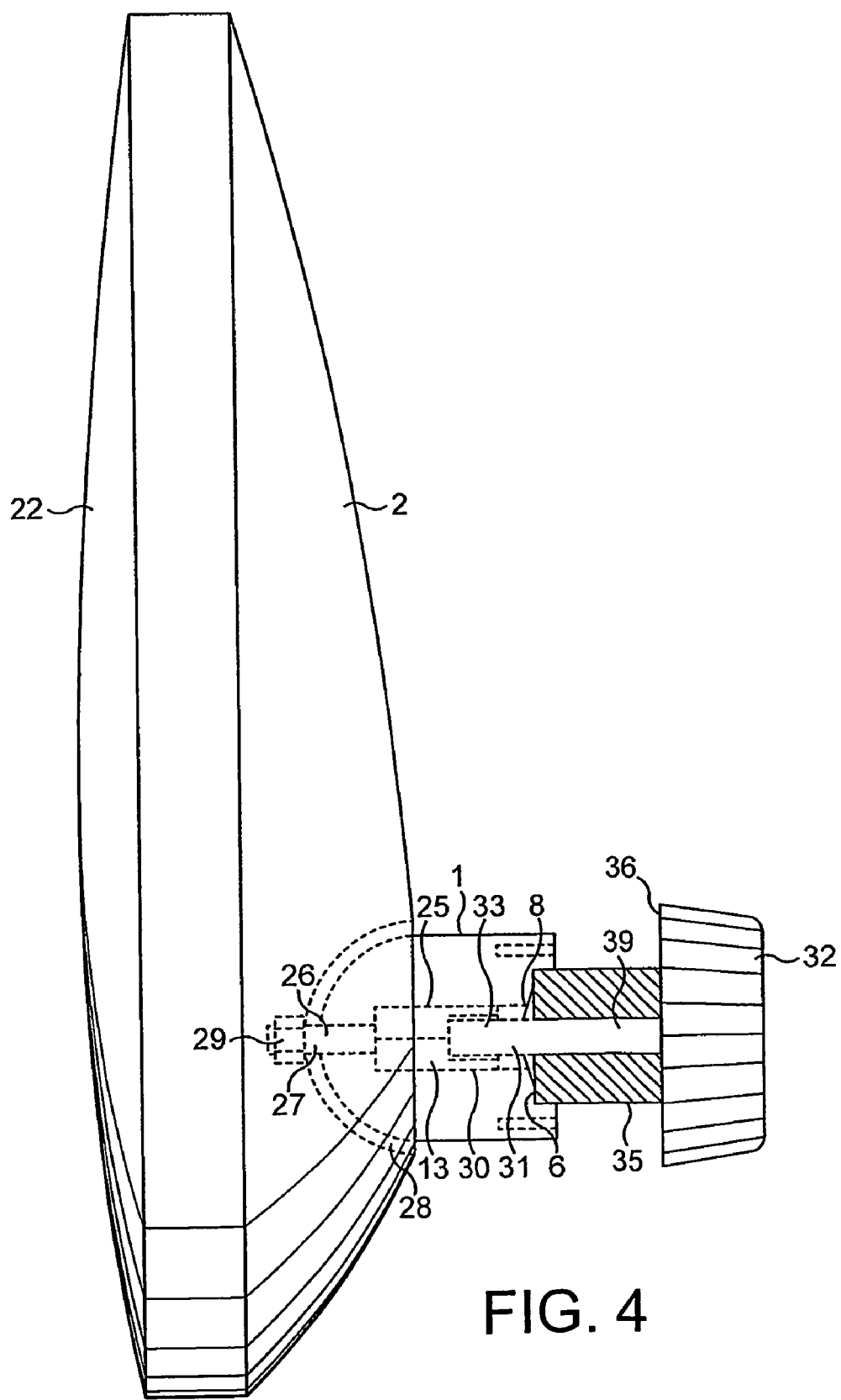

The mounting 1 is provided with a convex dome-shaped front 9, which is adapted to co-operate with a concave dome-shaped socket as shown in FIG. 4 in the back 10 of the rear view mirror 2. The mounting further comprises screw threaded sockets 11 which are adapted to receive bolts 12 (as shown in broken lines in FIGS. 2 and 3), and central aperture 13, which is formed from a first central bolt head portion 14, and a central bolt body portion 15.

FIG. 4 shows how a central bolt 25 is passed through the central aperture 13 in the mounting 1, through an aperture 26 in the back 10 of the mirror 2 and through an aperture 27 in a dome shaped washer 28 and held by a nut 29. The central bolt 25 has a head 30 provided with a hexagonal cross-section and a screw threaded socket 31, the use of which will be described with regard to the construction shown in FIG. 4.

The nut 29 is tightened to hold the mirror in position but enable it to be swiveled to different angles.

The cap 5 is a substantially U-shaped component, with two arms 16 extending from a base 17. The internal dimensions of the cap 5 are greater than the dimensions of the mounting 1, such that the cap 5 can be disposed over the mounting 1 as shown in FIGS. 2 and 3. The base 17 is also provided with a mirror arm engaging surface comprising a substantially U-shaped recess 18, which is 28 mm wide. A substantially rectangular recess is also provided by a pair of re-entrant cut-outs 18a on each side.

The base is provided with bores 19 (shown in broken lines) which are provided with apertures 20 of a smaller diameter at their inner ends. The bolts 12 can be received in the bores 19, but do not pass through as their heads 21 are of a larger diameter than the apertures 20.

The rear view mirror 2 is substantially rectangular in shape, and is dimensioned for use with a HGV or bus. The reflector 22 can be readily removed to allow access to the inner surface of the back portion 10, which may be required as described below.

The mirror 2 with the mounting 1 fixed to it is placed on one side of the mirror arm 4, and the cap 5 is placed on the opposite side. The bolts 12 are then passed through the bores 19 and apertures 20, and screwed into the sockets 11. Thus, the cap 5 urges the mirror arm engaging surface 3 into the mirror arm 4.

As shown in FIG. 2 the mirror arm 4 is provided with a substantially circular cross-section, which is received in the second recess 8, and the cap recess 18. The shapes of the recesses 8 and 18 act to hold the mirror 2 firmly in place on the mirror arm 4.

It will be appreciated that mirror arm 4 is less than 28 mm wide, and that mirror arms provided with diameters between substantially 16 mm and 28 mm can be accommodated between the recesses 8 and 18. The horizontal distance between the recesses 8 and 18 is adjusted by the position of the bolts 12, and the shapes of the mirror arm engaging surfaces 3 and 18 are such that the vertical depth of a 28 mm diameter mirror arm can be fitted inside them.

The distance between the edges 23 and 24 of the first recess 6 is calculated such that when a 28 mm diameter mirror arm is disposed in the second recess 8, its circumference does not contact the edges 23 and 24. In mounting 1 the two surfaces of the second recess 8 are angled at 120 degrees to one another, and the distance between the edges 23 and 24 is calculated accordingly. If the angle were greater than 120 degrees the edges 23 and 24 could be closer together, and if the angle were less than 120 degrees the edges 23 and 24 may have to be further apart.

The apparatus can however be made for use with mirror arms of any suitable dimensions.

FIG. 3 shows how the same mirror arm engaging surface 3 and clamping means in the form of the cap 5 can also be used with a mirror arm 4a with a square cross-section. When used in this application the corners 40 are located in the rectangular shaped recess 6 and the second rectangular shaped recess formed by the re-entrant cut-outs 18a in the U-shaped recess 18 in the cap 5. In order to clarify FIG. 3 the reference numerals relating to other parts have been omitted.

It will be appreciated that the dimensions of the square cross-section arm 4a can vary but can still be accommodated in the clamping means.

The present invention therefore provides a construction which can be used effectively with mirror arms which are of square or circular cross-section.

FIG. 4 shows an alternative construction which uses the same mounting 1 as that shown in FIGS. 1 to 3 but is intended for use with square or circular section mirror arms which are provided with a locating aperture. In FIG. 4 the invention is shown attached to a square cross-section mirror arm indicated by reference numeral 35. The arm 35 is located in the first substantially rectangular shaped recess 6 but if this embodiment is used with a circular mirror arm the side of the arm would rest in the V-shaped recess 8.

As shown in FIG. 4 the means for holding the mirror arm 35 against the mounting 1 is provided by a hand grip element 32 which has a screw threaded stem 33 which is passed through the aperture 34 in the mirror arm 35 and into the screw threaded socket 31 in the central bolt 25. The hand grip element 32 is formed with a flat mirror arm engaging surface 36.

To secure the mirror 2 in position on the mirror arm 35, the hand grip element 32 is tightened in a clockwise direction, until the bolt portion 33 is secured in the socket 31, and the central bolt 25 is secured to the nut 29. If the mirror 2 requires adjustment the hand grip element 32 is turned in an anti clockwise direction to loosen the stem 33 in the socket 31, and allow the mirror 2 to be adjusted. Therefore, the mirror 2 can be adjusted without having to dismantle all of the above described components, but the components can be dismantled by fully removing the stem 33 from the socket 31, and removing mounting 1 from the mirror arm 35. A suitable tool can then applied to the hexagonal head 30 to release the central bolt 25 from the nut 29.

As is shown in the Figures the mounting 1 is provided with both the sockets 11 and the central aperture 13, which allows it to be used in the arrangements shown in FIGS. 2 and 3.

In the arrangements described above mirror arms or circular or square cross-section are shown but it will be appreciated that the invention can also be used with mirror arms of other cross-sections, for example rectangular or any polygonal shape.

Thus a rear view mirror mounting is provided which can be readily mounted to mirror arms of both circular and square cross sections and of various dimensions which is simple to use, and utilises a small number of parts.

The invention claimed is:

1. An external rear view mirror of a vehicle, comprising: a mirror mounting; a reflector; and a back, said mirror mounting being mounted on said back for connecting said rear view mirror to an external mirror mounting arm located externally on the vehicle and having a length which has a polygonal or a circular cross-section, said mounting having a rear view mirror and an open recess in which the mirror mounting arm is located, said recess having a planer base which provides a mirror mounting arm engaging surface, the cross-section of said open recess being substantially rectangular and the planer base forming a long side of said rectangular recess, said long side having ends, each of the ends of said long side joining an end wall perpendicular to said long side, said end walls being arranged in parallel planes so that the end walls have surfaces facing towards each other; a V-shaped recess in said planer base to receive a mirror mounting arm, having a polygonal or a circular cross-section; the width of said V-shaped recess being less than the length of said long side such that a flat section of said long side remains on each side of the V-shaped recess and extends up to the adjacent end wall to receive a mirror mounting arm of polygonal cross-section selected from a square or a rectangle; said V-shaped recess having two surfaces which are angled at 120° to each other and extend up to the planer base; and clamp means provided on said mounting which engage said mirror mounting arm and clamp said mirror mounting arm to said planer base.

2. The rear view mirror of claim 1, where the mirror arm engaging surface is adapted to engage mirror arms with a substantially circular or multi-sided cross section with a diameter of between substantially 16 mm and substantially 28 mm.

3. The rear view mirror of claim 1, where the depth of the V-shaped recess is such that when a mirror arm with a substantially circular or multi-sided cross section with a diameter of substantially 28 mm is engaged, the mirror arm does not contact the base.

4. The rear view mirror of claim 3, further comprising means for securing the mounting to a rear view mirror and in which the clamping means comprise a cap, the internal dimensions of which are greater than the mounting so that the cap can be placed over the mounting and a pair of fasteners passed through the cap and into sockets provided in the mounting.

5. The rear view mirror of claim 4, where the cap is provided with a mirror arm engaging surface comprising a substantially V or U-shaped recess.

6. The rear view mirror of claim 5, where the recess in the cap is substantially 28 mm wide.

7. The rear view mirror of claim 6, where the V or U-shaped recess in the cap is provided with re-entrant cut-outs to engage the corners of polygonal cross-section arms.

8. The rear view mirror of claim 7, where the arms are of square cross-section.

9. The rear view mirror of claim 1, where the mounting is releasably attachable to said rear view mirror and the clamping means comprise a central fastener which passes through an aperture provided on the mirror arm with which it is to be used and provided in the base of the mounting and through an aperture provided in the back of the rear view mirror, which it is attached by securing means.

10. The rear view mirror of claim 9, where the fastener is in the form of a bolt which is provided with a socket in its head adapted to receive the secured fastener of an outer clamping member.

11. The rear view mirror of claim 10, where the outer clamping member has a substantially flat mirror arm engaging surface and a hand grip portion.

12. The rear view mirror of claim 11, where the central bolt is provided with a shaped head to allow release by a suitably shaped tool.

13. The rear view mirror of claim 1, where the mounting is secured to the mirror with which said mounting is to be used by a universal joint.

* * * * *